| (12) | United States Patent | (10) Patent No.: US 10,539,026 B2 |
|---|---|---|
| | Xu | (45) Date of Patent: Jan. 21, 2020 |

(54) GAS TURBINE ENGINE COMPONENT WITH COOLING HOLES HAVING VARIABLE ROUGHNESS

(71) Applicant: United Technologies Corporation, Farmington, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 174 days.

(21) Appl. No.: 15/710,874

(22) Filed: Sep. 21, 2017

(65) Prior Publication Data

US 2019/0085707 A1  Mar. 21, 2019

(51) Int. Cl.
  *F01D 5/18* (2006.01)
  *F01D 11/08* (2006.01)
  *F01D 5/28* (2006.01)

(52) U.S. Cl.
  CPC ............ *F01D 5/186* (2013.01); *F01D 5/284* (2013.01); *F01D 5/288* (2013.01); *F01D 11/08* (2013.01); *F05D 2230/13* (2013.01); *F05D 2230/90* (2013.01); *F05D 2300/516* (2013.01); *F05D 2300/6033* (2013.01); *F05D 2300/611* (2013.01)

(58) Field of Classification Search
  CPC .......... F01D 5/186; F01D 5/284; F01D 5/288; F01D 11/08; F04D 29/38; F04D 29/384; F04D 29/388; F05D 2220/32; F05D 2230/13; F05D 2230/90; F05D 2300/516; F05D 2300/6033; F05D 2300/611
  See application file for complete search history.

(56) References Cited

U.S. PATENT DOCUMENTS

| 4,529,358 A | 7/1985 | Papell |
| 4,705,455 A | 11/1987 | Sahm et al. |
| 4,762,464 A * | 8/1988 | Vertz .................. B23H 9/10 |
| | | 219/69.1 |
| 5,062,768 A | 11/1991 | Marriage |
| 5,382,133 A | 1/1995 | Moore et al. |
| 5,498,133 A | 3/1996 | Lee |
| 5,609,779 A | 3/1997 | Crow et al. |

(Continued)

FOREIGN PATENT DOCUMENTS

| EP | 0742347 | 11/1996 |
| EP | 0959228 A1 | 11/1999 |

(Continued)

OTHER PUBLICATIONS

Haven, B.A. And Kurosaka, M. (1997). Kidney and anti-kidney vortices in crossflow jets. Department of Aeronautics and Astronautics, University of Washington, Seattle. pp. 27-64.

(Continued)

*Primary Examiner* — Igor Kershteyn
(74) *Attorney, Agent, or Firm* — Carlson, Gaskey & Olds, P.C.

(57) ABSTRACT

A gas turbine engine component has an engine component body and at least one hole formed within the engine component body and extends between a hole inlet and a hole outlet. The hole has a first portion with a first roughness and a second portion having a second roughness that is less than the first roughness. The first portion is upstream of the second portion. A gas turbine engine and a method of forming a cooling hole are also disclosed.

28 Claims, 4 Drawing Sheets

(56) References Cited

U.S. PATENT DOCUMENTS

| | | | |
|---|---|---|---|
| 5,639,216 A | 6/1997 | McLaurin et al. | |
| 5,683,600 A | 11/1997 | Kelley et al. | |
| 5,688,104 A | 11/1997 | Beabout | |
| 5,700,131 A | 12/1997 | Hall et al. | |
| 5,813,836 A | 9/1998 | Starkweather | |
| 6,170,266 B1 | 1/2001 | Pidcock et al. | |
| 6,183,199 B1 | 2/2001 | Beeck et al. | |
| 6,190,130 B1 | 2/2001 | Fukue et al. | |
| 6,234,755 B1 | 5/2001 | Bunker et al. | |
| 6,243,948 B1 * | 6/2001 | Lee | B23P 6/002 29/402.05 |
| 6,287,075 B1 | 9/2001 | Kercher | |
| 6,340,284 B1 | 1/2002 | Beeck et al. | |
| 6,368,060 B1 | 4/2002 | Fehrenbach et al. | |
| 6,402,471 B1 | 6/2002 | Demers et al. | |
| 6,887,033 B1 | 5/2005 | Phillips et al. | |
| 6,979,176 B2 | 12/2005 | Nakamata et al. | |
| 7,217,094 B2 | 5/2007 | Cunha et al. | |
| 7,220,103 B2 | 5/2007 | Cunha et al. | |
| 7,246,992 B2 | 7/2007 | Lee | |
| 7,328,580 B2 | 2/2008 | Lee et al. | |
| 7,374,401 B2 | 5/2008 | Lee | |
| 7,413,406 B2 | 8/2008 | Pietraszkiewicz et al. | |
| 7,581,927 B2 | 9/2009 | Cunha | |
| 7,695,247 B1 | 4/2010 | Liang | |
| 7,883,320 B2 | 2/2011 | Pietraszkiewicz et al. | |
| 8,070,436 B2 | 12/2011 | Mitchell | |
| 8,079,812 B2 | 12/2011 | Okita | |
| 8,083,485 B2 | 12/2011 | Chon et al. | |
| 8,105,030 B2 | 1/2012 | Abdel-Messeh et al. | |
| 8,206,114 B2 | 6/2012 | Spangler et al. | |
| 8,366,393 B2 | 2/2013 | Tibbott | |
| 2002/0076324 A1 | 6/2002 | Abuaf et al. | |
| 2003/0123953 A1 | 7/2003 | Razzell | |
| 2004/0072014 A1 | 4/2004 | Hasz et al. | |
| 2005/0111979 A1 | 5/2005 | Liang | |
| 2006/0099074 A1 * | 5/2006 | Kopmels | F01D 5/186 416/97 R |
| 2007/0134099 A1 | 6/2007 | Lee et al. | |
| 2007/0163114 A1 * | 7/2007 | Johnson | B22F 3/1055 29/889.2 |
| 2008/0003096 A1 | 1/2008 | Kohli et al. | |
| 2008/0240919 A1 | 10/2008 | Liang | |
| 2009/0028703 A1 | 1/2009 | Devore | |
| 2009/0269184 A1 | 10/2009 | Spangler et al. | |
| 2009/0304494 A1 * | 12/2009 | Strock | F01D 5/186 415/1 |
| 2010/0068067 A1 | 3/2010 | Liang | |
| 2010/0104419 A1 | 4/2010 | Liang | |
| 2010/0119377 A1 * | 5/2010 | Tibbott | F01D 5/186 416/97 R |
| 2010/0135772 A1 | 6/2010 | Liang | |
| 2010/0329835 A1 | 12/2010 | Spangler et al. | |
| 2012/0087803 A1 | 4/2012 | Butler et al. | |
| 2013/0139990 A1 * | 6/2013 | Appleby | B22C 9/22 164/47 |
| 2013/0280091 A1 | 10/2013 | Propheter-Hinckley | |
| 2014/0023497 A1 | 1/2014 | Giglio et al. | |
| 2014/0161585 A1 * | 6/2014 | Arness | F01D 5/186 415/1 |
| 2015/0016947 A1 | 1/2015 | Kwon | |
| 2017/0089579 A1 | 3/2017 | Bunker et al. | |
| 2017/0101870 A1 * | 4/2017 | Lewis | F01D 5/186 |
| 2017/0152749 A1 | 6/2017 | Bunker et al. | |
| 2017/0167274 A1 * | 6/2017 | Itzel | F01D 5/189 |
| 2017/0198911 A1 * | 7/2017 | Wang | F01D 5/288 |

FOREIGN PATENT DOCUMENTS

| | | |
|---|---|---|
| EP | 0965728 A2 | 12/1999 |
| EP | 1126135 A2 | 8/2001 |
| EP | 2230383 A1 | 9/2010 |
| EP | 3156597 A1 | 4/2017 |

OTHER PUBLICATIONS

Heidmann, J.D. (2008). A numerical study of anti-vortex film cooling designs at high blowing ratio. Glenn Research Center, Cleveland, Ohio. NASA/TM—2008-215209.

European Search Report for European Application No. 18195433.0 dated Jan. 30, 2019.

* cited by examiner

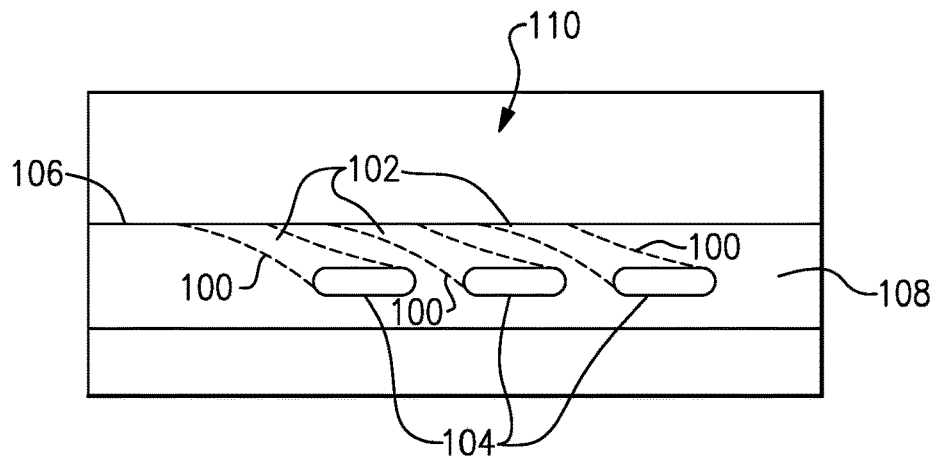
FIG.5
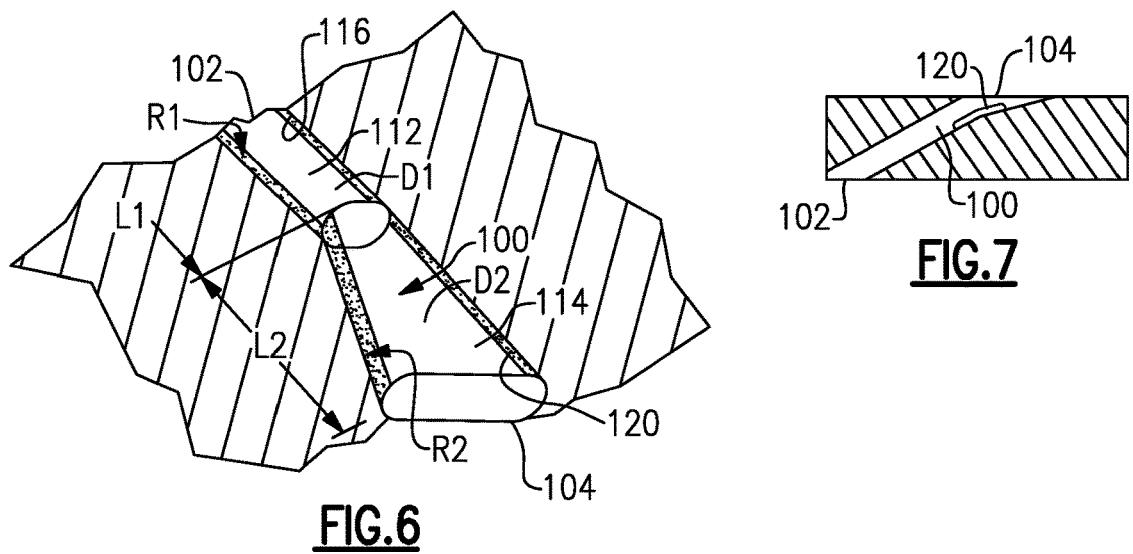
FIG.6
FIG.7
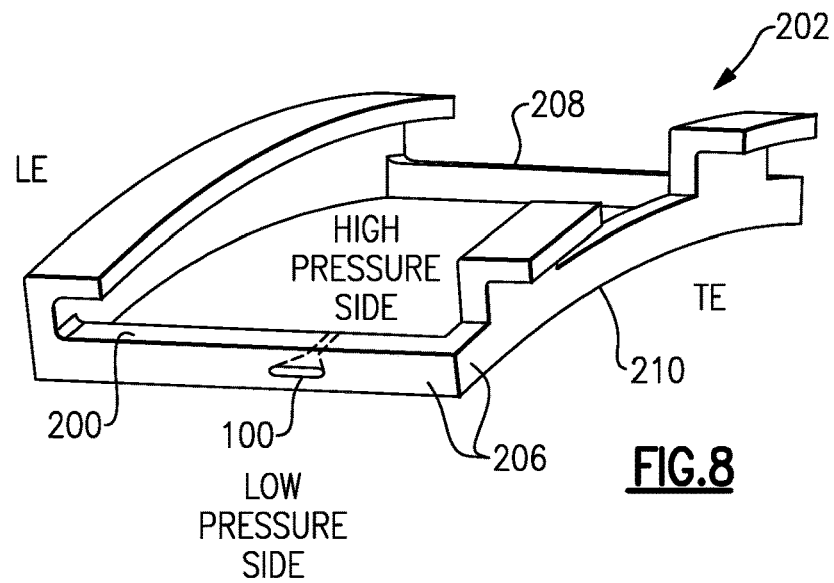
FIG.8

GAS TURBINE ENGINE COMPONENT WITH COOLING HOLES HAVING VARIABLE ROUGHNESS

BACKGROUND OF THE INVENTION

In pursuit of higher engine efficiencies, higher turbine inlet temperatures have been relied upon to boost overall engine performance. This can result in gas path temperatures that may exceed melting points of turbine component constituent materials such as high temperature alloys, for example. To address this issue, materials such as ceramic matrix composites (CMC) have been used to provide a lower weight option that can operate in a high temperature environment as compared to traditional metal materials.

Additionally, film cooling holes have been formed in components made from CMC materials, such as blades or vanes for example, to improve the overall thermal characteristics of the component. A plurality of film cooling holes are typically formed on the respective component to extend from a cooling surface side to a hot surface side. These film cooling holes are typically machined to form cooling flow passages through the component that direct cooling air flow to the hot surface side of the component. The machining process can create irregularities within the flow passage which can generate turbulent flow through the passage. Such turbulent flow is not desirable as it may result in hot air entrainment which can adversely affect the overall thermal performance of the component.

SUMMARY OF THE INVENTION

In a featured embodiment, a gas turbine engine component has an engine component body and at least one hole formed within the engine component body and extends between a hole inlet and a hole outlet. The hole has a first portion with a first roughness and a second portion having a second roughness that is less than the first roughness. The first portion is upstream of the second portion.

In another embodiment according to the previous embodiment, the engine component body is comprised of a ceramic matrix composite material or monolithic ceramic material.

In another embodiment according to any of the previous embodiments, the first surface roughness is no more than 20 mils and the second roughness is within a range of 0 to 10 mils.

In another embodiment according to any of the previous embodiments, the first portion comprises a metering portion defined by a first cross-sectional area and the second portion comprises a diffusing portion defined by a second cross-sectional area that is greater than the first cross-sectional area.

In another embodiment according to any of the previous embodiments, at least a portion of the diffusing portion is coated with at least one of an environmental barrier coating and thermal barrier coating.

In another embodiment according to any of the previous embodiments, surface roughness gradually and continuously decreases along an inner hole surface of the at least one hole in a direction extending from an inlet of the first portion to an outlet of the second portion.

In another embodiment according to any of the previous embodiments, at least one hole extends from a first surface to a second surface that is exposed to a higher temperature than the first surface, and wherein the hole inlet is in fluid communication with a cooling air flow and the hole outlet directs cooling flow to the second surface.

In another embodiment according to any of the previous embodiments, the engine component body comprises at least one of an airfoil. At least one hole comprises a film cooling hole in the airfoil, a combustor panel, wherein the at least one hole comprises a cooling hole in the combustor panel, and a blade outer air seal, wherein the at least one hole comprises a cooling hole in the blade outer air seal.

In another embodiment according to any of the previous embodiments, the first surface roughness is within a range of 4 to 7 mils and the second roughness is within a range of 0 to less than 4 mils.

In another embodiment according to any of the previous embodiments, the first surface roughness is within a range of 5 to 6 mils and the second roughness is within a range of 0.5 to 1 mils.

In another featured embodiment, a gas turbine engine has a compressor section, a combustor section downstream of the compressor section, and a turbine section downstream of the combustor section. At least one of the combustor section and the turbine section include a component having a body with at least one hole formed within the body and extending between a hole inlet and a hole outlet, and wherein the hole has a first portion having a first roughness and a second portion having a second roughness that is less than the first roughness, and wherein the first portion is upstream of the second portion.

In another embodiment according to the previous embodiment, the engine component body is comprised of a ceramic matrix composite material or monolithic ceramic material.

In another embodiment according to any of the previous embodiments, the first surface roughness is no more than 10 mils and the second roughness is within a range of 0 to 4 mils.

In another embodiment according to any of the previous embodiments, the first portion comprises a metering portion and the second portion comprises a diffusing portion, and wherein at least a portion of the diffusing portion is coated with at least one of an environmental barrier coating and a thermal barrier coating.

In another embodiment according to any of the previous embodiments, the first portion comprises a metering portion and the second portion comprises a diffusing portion, and wherein the component comprises at least one of an airfoil, combustor panel, and blade outer air seal, and wherein the at least one hole comprises a cooling hole that extends from a first surface on the body to a second surface on the body that is exposed to a higher temperature than the first surface, and wherein the hole inlet is in fluid communication with a cooling air flow and the hole outlet directs cooling flow to the second surface.

In another featured embodiment, a method of forming a cooling hole for a gas turbine engine includes the steps of forming at least one hole in an engine component body to extend between a hole inlet and a hole outlet, and forming the hole with a first portion having a first roughness and a second portion having a second roughness that is less than the first roughness, wherein the first portion is upstream of the second portion.

In another embodiment according to the previous embodiment, the engine component body is formed from a ceramic matrix material or monolithic ceramic material.

In another embodiment according to any of the previous embodiments, the first surface roughness is formed to be no more than 10 mils and the second roughness to be within a range of 0 to 4 mils.

In another embodiment according to any of the previous embodiments, the first portion comprises a metering portion and the second portion comprises a diffusing portion, and including coating at least a portion of the diffusing portion with at least one of an environmental barrier coating and a thermal barrier coating.

In another embodiment according to any of the previous embodiments, the second portion is at the hole outlet and the first portion is at the hole inlet, and including laser drilling from a side of the component that includes the second portion to form the hole.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 5 is one example embodiment of a cooling hole configuration.

FIG. 6 is a schematic representation of a cooling hole as shown in FIG. 5.

FIG. 7 is a schematic representation of a component cross-section including a cooling hole as shown in FIGS. 5-6.

FIG. 8 is a perspective view of a blade outer air seal incorporating the cooling hole configuration shown in FIGS. 6-7.

DETAILED DESCRIPTION

Figure 1:
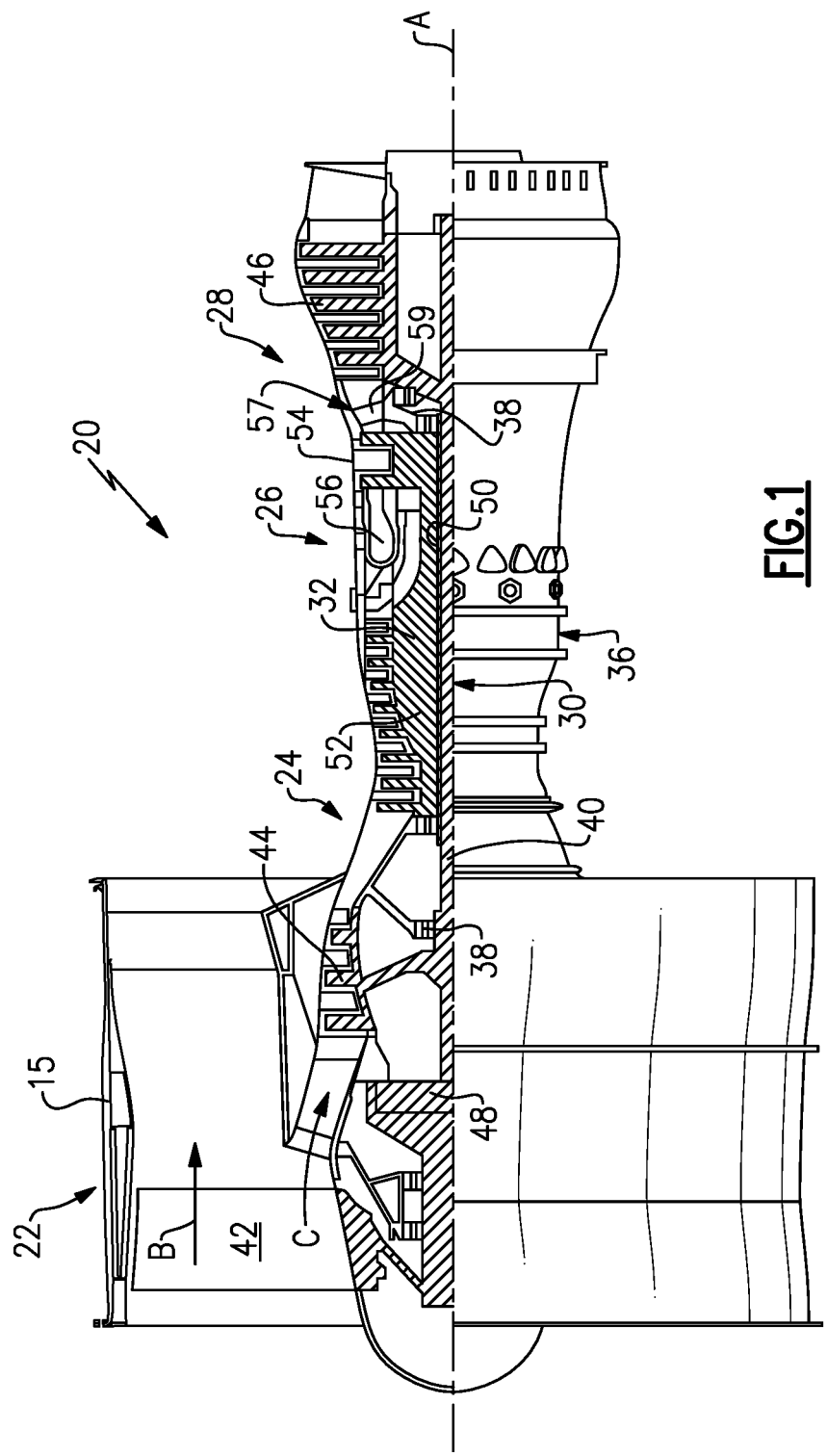
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
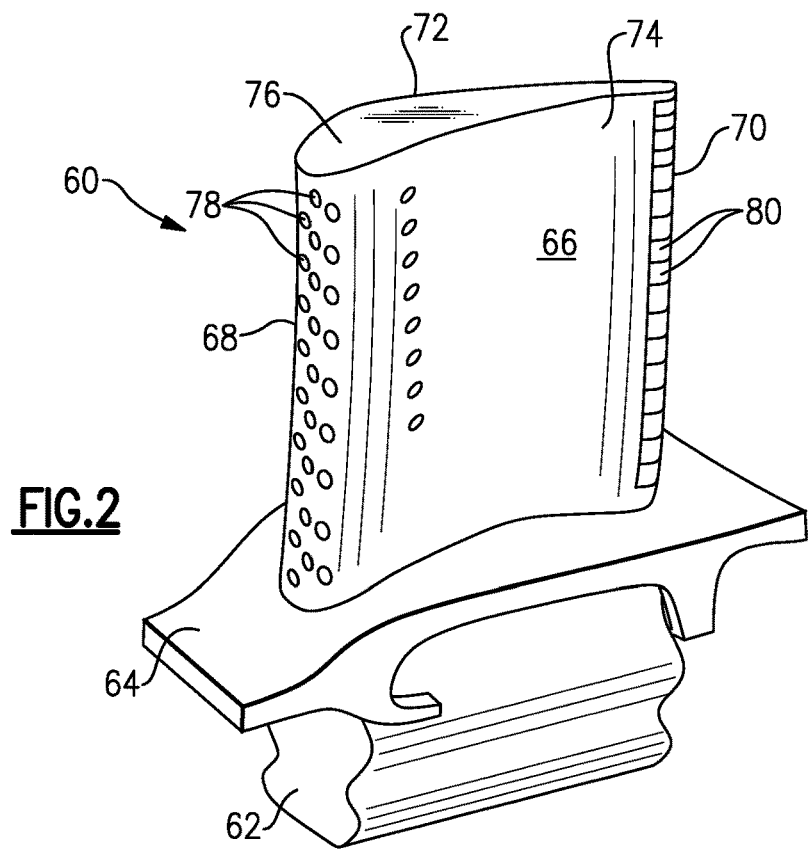
FIG. 2 is a side perspective view of a turbine blade.

Airfoils located downstream of combustor section 26, such as stator vanes and rotor blades in the turbine section 28, for example, operate in a high-temperature environment. Airfoils that are exposed to high temperatures typically include internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80.

The platform 64 connects one end of the airfoil section 66 to the root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect the leading edge 68 and the trailing edge 70. In one example, film cooling holes 78 are arranged over a surface of airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

Figure 3:
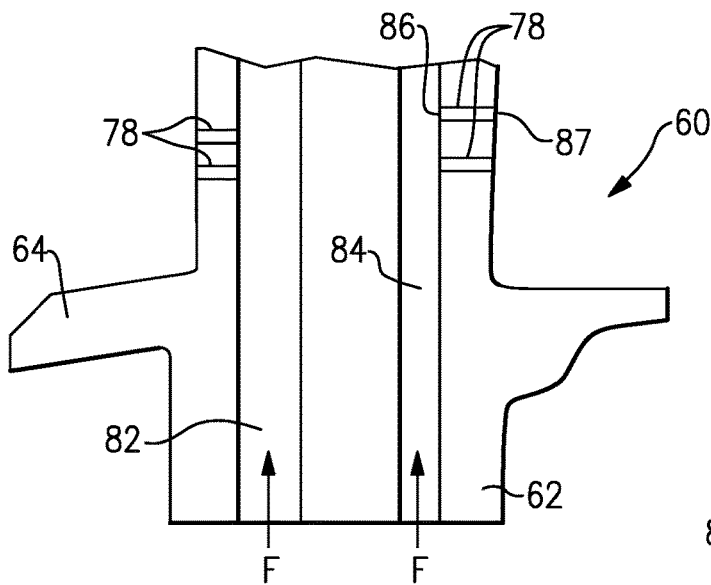
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68 and a second cooling channel 84 positioned aft of the first cooling channel 82. The cooling channels 82, 84 direct cooling flow F radially outwardly toward the tip 76 of the blade 60. The cooling channels 82, 84 receive cooling air flow from a cooling source and deliver cooling flow to the film cooling holes 78 and the cooling slots 80. Each cooling slot 80 or hole 78 includes an inlet 86 that receives cooling flow from the passage 82, 84 and an outlet 87 that directs cooling flow to the external surface of the blade 60 as shown in FIG. 3. It should be understood that the cooling hole configuration shown in FIGS. 2-3 is merely one example, and that the holes and/or slots can be located in various locations and in different combinations to provide a desired cooling configuration.

Figure 4:
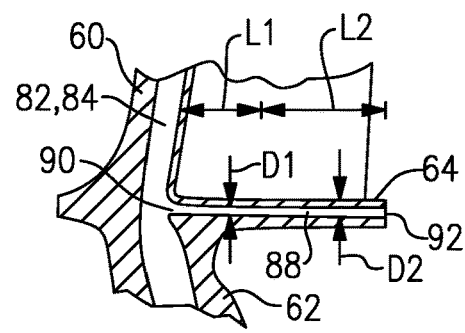
FIG. 4 is a section view of a portion of an airfoil and associated platform.
Figure 9:
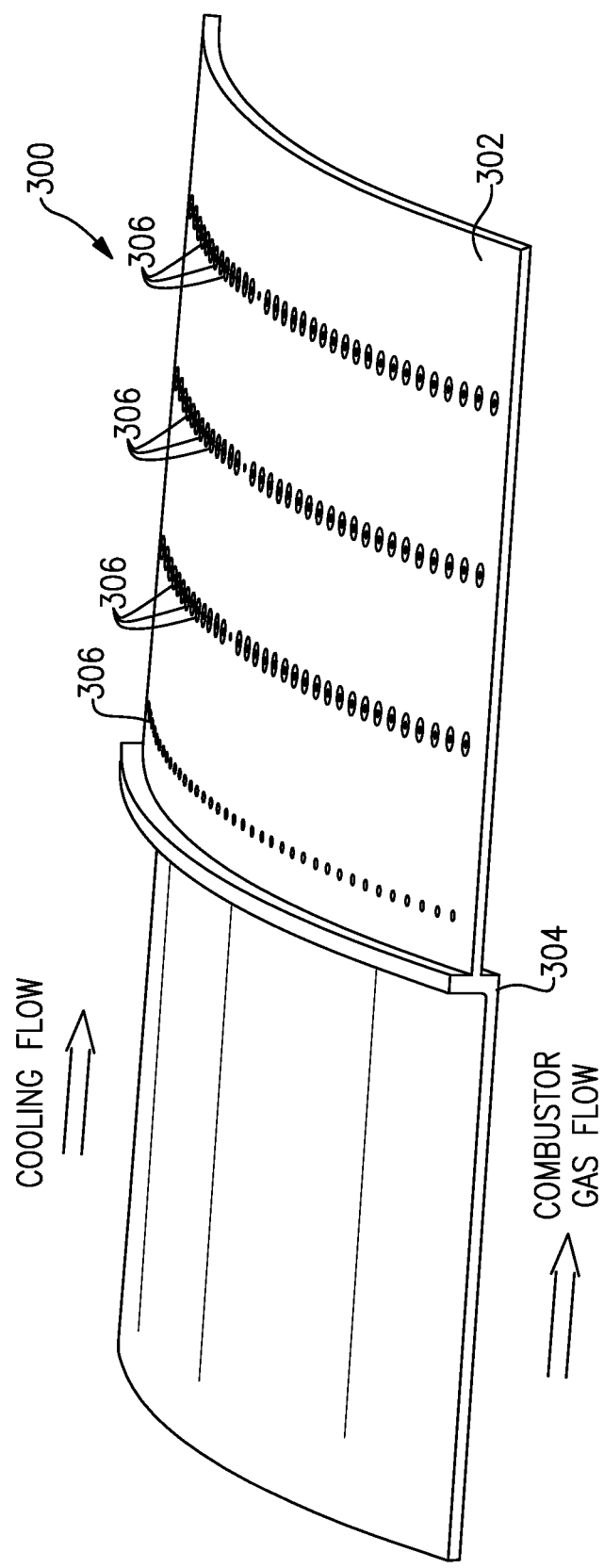
FIG. 9 is a perspective view of a combustor panel incorporating the cooling hole configuration shown in FIGS. 6-7.

In another example shown in FIG. 4, the blade 60 includes one or more internal cooling passages 82, 84 that receive cooling air flow to be directed to the platform 64. In this example, there is at least one cooling hole 88 formed within the platform 64 that receives cooling flow from the cooling passage 82, 84. The cooling hole 88 has an inlet 90 to receive the cooling flow from the cooling passage 82, 84 and an outlet 92 at an edge of the platform 64. It should be understood that the configuration shown in FIG. 4 is merely one example, and one or more outlets 92 could be positioned at other locations along any surface of the platform 64, for example.

In exemplary embodiments, the cooling holes 78, 80, 88 increase in size in a direction toward the outlet 87, 92. The cooling holes 78, 88 and/or cooling slots 80 are formed to include a metering portion and a diffusing portion to control cooling flow supplied to an outer surface of the associated component external surface. FIGS. 5-6 disclose one example of cooling holes 100 having this type of configuration. The cooling holes 100 shown in FIGS. 5-6 can be used in any of the examples discussed herein.

As discussed above, each cooling hole 100 extends between a hole inlet 102 and a hole outlet 104. The inlets 102 are adjacent a first surface 106 and the outlets 104 are adjacent to a second surface 108. The first surface 106 is an internal surface that is exposed to a cooling air flow from a cooling passage 110. The second surface 108 is typically an external surface that is exposed to a higher temperature than the first surface 106. The hole inlets 102 are thus in fluid communication with a cooling air flow and the hole outlets 104 direct cooling flow to the second surface 108 to provide film cooling. In certain configurations, each hole 100 may include multiple hole outlets to provide increased cooling as needed.

As shown in FIG. 6, each cooling hole 100 is defined by a first cross-section D1 at the inlet 102 and a second cross-section D2 at the outlet 104, where the first cross-section D1 is less than the second cross-section D2. In the example shown, the first cross-section D1 extends along a first length L1 and the second cross-section D2 extends along a second length L2 that is greater than the first length L1. The portion of the cooling hole 100 that extends along the first length L1 comprises a metering portion 112 that sets the flow rate into the cooling hole 100. The portion of the cooling hole 100 that extends along the second length L2 comprises a diffusing portion 114 that spreads the flow and slows the flow rate down before ejecting the flow out of outlet 104. In the example shown, the diffusing portion 114 is generally aligned with the metering portion 112; however, the diffusing portion 114 could be orientated vertically or at any angle between a horizontal and vertical configuration. Further, while the second length L2 is shown as being greater than the first length L1, it should be understood that there are configurations where the first length L1 would be greater than the second length L2. For example, for cooling holes having a relatively long overall length, the second length L2 could be less than the first length L1.

The first cross-section D1 defines a minimum cross-sectional area for the cooling hole 100 and the second cross-section D2 defines a maximum cross-sectional area for the cooling hole 100. The cross-sectional shape for each portion can comprise any of various shapes such as circular, square, rectangular, oval, multi-lobed, etc.

In the non-limiting example shown, the first cross-section D1 comprises a rounded section (FIG. 6) that generally remains constant along the first length L1, and the second cross-section D2 comprises an oval or elliptical shape. The cooling hole 100 comprises an increasing cross-sectional size as the cooling hole 100 extends from an end of the first length L1 to the end of the second length L2, i.e. the oval shape of the second cross-section D2 starts to continuously increase in size along the second length L2. As discussed above, this configuration forms the metering portion 112 beginning at the inlet 102 and a diffusing portion 114 that terminates at the outlet 104. This allows for a precise control of the flow rate entering the cooling hole 100 with a subsequent spreading or diffusing of the flow internally within the component to better draw heat out of the component.

In one example, the cooling hole 100 is formed within a component that is made from a ceramic matrix composite (CMC) material that has a high temperature capability. Examples of CMC materials include, but are not limited to:

alumina matrix material, silicon, silica or silicon carbide materials and any various combinations thereof. The matrix can include embedded ceramic fibers such as oxidation stable reinforcing fibers including monofilaments like silicon carbide for example, or can include yarn material comprising alumina silicates, silicon carbide (NICALON®, SYLRAMIC®, etc. for example), and/or chopped whiskers of similar materials. The CMC material may also include ceramic particles such oxides of Al, Si, Y, Zr and/or inorganic fillers as needed. It should be understood that these are just some examples of CMC materials and that other types of CMC materials could also be used. Optionally, monolithic ceramic or other similar high heat and highs strength materials could also be used.

As shown in FIGS. 6-7, each hole 100 formed in the CMC material is defined by an internal surface 116 that extends from the inlet 102 to one or more outlets 104. In one example, the internal surface 116 of the hole 100 has a variable surface roughness that varies from the inlet 102 to the outlet 104. In one example, the metering portion 112 has a first roughness R1 and the diffusing portion 114 has a second roughness R2 that is less than the first roughness RE Thus, the diffusing portion 114 provides a smoother surface than that of the metering portion 112. The advantage with this type of configuration is that the possibility of generating turbulent flow within the cooling hole 100 is greatly reduced. This improves the film cooling effect as the cooling flow exits the outlets 104 of the holes 100.

In one example, the first surface roughness R1 is no more than 20 mils. In another example, the first surface roughness R1 is no more than 10 mils. In another example, the first surface roughness R1 is within a range of 4-7 mils. In another example, the first surface roughness R1 is within a range of 5-6 mils. In one example, the second surface roughness R2 is no more than 10 mils. In another example, the second surface roughness R2 is within a range of 0 to 4 mils. In another example, the second surface roughness R2 is within a range of 0.5 to 1 mils. In one example, the first surface roughness is no more than 20 mils and the second roughness is within a range of 0 to 10 mils. Any of various combinations of the first R1 and second R2 surface roughnesses can be utilized within these ranges as long as the first roughness R1 is greater than the second roughness R2. In one example, the metering portion 112 has a first roughness R1 along its entire length L1 and the diffusing portion 114 has a second roughness R2 along its entire length L2. In another example, the first R1 and second R2 surface roughnesses can be varied in sections and/or continuously variable along their respective lengths L1, L2. In one example, the surface roughness gradually and continuously decreases along the inner hole surface 116 in a direction extending from the inlet 102 to the outlet 104.

The cooling holes 100 are formed during manufacturing of the component to provide the specified roughness configuration. In one example, laser drilling or a similar machining process is used to form the holes 100. The laser drilling takes place at a diffusion side of the cooling hole 100 at the outlet 104. Multiple blasts from the laser drill are required to form each hole 100. By drilling from the diffusing side, a smoother surface is formed in the diffusing portion 114 than in the metering portion 112.

In another example, the internal surface 116 of at least a portion of the diffusing portion 114 is coated with a coating 120 (FIG. 6) comprising at least one of a thermal barrier coating (TBC) and environmental barrier coating (EBC) to provide a smoother surface in the diffusing portion 114. The coating 120 also provides protection for the CMC material.

Under certain conditions, the surfaces of the component can be exposed to temperatures as high as 2000 degrees Celsius which can induce high thermal stress into the component. Further, the exhaust vapor exiting the combustor can degrade surfaces of a CMC material. The TBC and/or EBC helps protect these surfaces from experiencing high thermal stress and from degrading under the high temperatures. As such, the TBC and/or EBC can be used to coat external as well as internal component surfaces as needed.

In one example, a portion of the diffusing portion 114 that is proximate to an exit of the cooling hole 100 is coated with the coating 120. In one example, the EBC and TBC comprises a low conductivity coating that can be comprised of one or more coating layers. The EBC, for example, can have a thermal conductivity that is up to 10 times less than a thermal conductivity of the CMC material. In one example, the EBC coating comprises a first layer that includes silicon or silica and at least one or more secondary layers that include any of the following in any combination thereof: a rare earth silicate layer, a yttrium monosilicate, a mullite layer and/or a mullite and alkaline earth aluminosilicate layer, a barium strontium aluminosilicate layer, an ytterbium based layer, or layers of other similar materials. In one example, the TBC includes yttria-stabilized zirconia (YSZ). The coating 120 may be a TBC, an EBC, or a combination of both. The coating 120 can be applied via chemical vapor deposition (CVD) or chemical vapor infiltration (CVI), or any other coating process.

While FIGS. 2-4 show examples of cooling holes formed within an airfoil or platform, FIG. 7 shows an example where a platform 200 of a blade outer air seal (BOAS) component 202 includes a at least one cooling hole 100 formed as described above. The cooling hole 100 can be formed within one of a plurality of platform matefaces 206 that extend between an upper surface 208 and lower surface 210. Further, while only one cooling hole 100 is shown, it should be understood that the platform 200 could include a plurality of cooling holes 100 in any of various locations on the BOAS.

Another example of a cooling hole application is shown in FIG. 8. In this example, the cooling circuit is formed within a combustor panel 300. The combustor panel 300 includes an outer surface 302 that faces a cooling flow path and an inner surface 304 that faces a hot combustor gas flow path. A plurality of impingement cooling holes 306 are formed within the combustor panel 300. The holes 306 are similar to those shown in FIGS. 5-6. In one example, the impingement holes 306 are arranged in axially spaced rows and the holes 306 in each row are circumferentially spaced apart from each other. Other hole patterns and arrangements could also be used. The holes 306 direct cooling flow to cool the inner surface 304.

The subject hole configuration is discussed with regard to exemplary embodiments that include cooling holes in airfoils, BOAS, and combustor panels, for example. The hole configuration can also be used in other components that require cooling or can be used in other components where turbulent exit flow reduction is required.

The subject invention provides a configuration that provides a smoother surface for a downstream portion of each hole as compared to an upstream portion. This reduces the possibility of turbulent flow exiting the hole and also increases cooling efficiency in cooling hole applications.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
an engine component body; and
at least one hole formed within the engine component body and extending between a hole inlet and a hole outlet, wherein the hole has a first portion extending along a first length and having a first roughness and a second portion extending along a second length and having a second roughness that is less than the first roughness, and wherein the first portion is upstream of the second portion and the second length is greater than the first length.

2. The gas turbine engine component according to claim 1, wherein the engine component body is comprised of a ceramic matrix composite material or monolithic ceramic material.

3. The gas turbine engine component according to claim 2, wherein the first roughness is within a first range of no more than 20 mils and the second roughness is within a second range of 0 to 10 mils, and wherein any of various combinations of the first and second roughnesses can be utilized within the first and second ranges as long as the first roughness is always greater than the second roughness.

4. The gas turbine engine component according to claim 2, wherein the first portion comprises a metering portion defined by a first cross-sectional area and the second portion comprises a diffusing portion defined by a second cross-sectional area that is greater than the first cross-sectional area, and wherein the first length extends from the hole inlet to an end of the metering portion and the second length extends from the end of the metering portion to the hole outlet.

5. The gas turbine engine component according to claim 4, wherein at least a portion of an internal surface of the diffusing portion is coated with at least one of an environmental barrier coating and thermal barrier coating.

6. The gas turbine engine component according to claim 4, wherein the at least one hole extends from a first surface to a second surface that is exposed to a higher temperature than the first surface, and wherein the hole inlet is in fluid communication with a cooling air flow and the hole outlet directs cooling flow to the second surface.

7. The gas turbine engine component according to claim 6, wherein the engine component body comprises at least one of
an airfoil, wherein the at least one hole comprises a film cooling hole in the airfoil, a combustor panel, wherein the at least one hole comprises a cooling hole in the combustor panel, and
a blade outer air seal, wherein the at least one hole comprises a cooling hole in the blade outer air seal.

8. The gas turbine engine component according to claim 2, wherein the first surface roughness is within a range of 4 to 7 mils and the second roughness is within a range of 0 to less than 4 mils.

9. The gas turbine engine component according to claim 2, wherein the first surface roughness is within a range of 5 to 6 mils and the second roughness is within a range of 0.5 to 1 mils.

10. The gas turbine engine component according to claim 1 wherein the first roughness is within a first range of more than 4 mils to 20 mils and the second roughness is within a second range of 0.5 mil to 4 mils.

11. The gas turbine engine component according to claim 4 wherein the first cross-sectional area is round and is constant along the first length, and wherein the second cross-sectional area is oval or elliptical.

12. A gas turbine engine component comprising:
an engine component body; and
at least one hole formed within the engine component body and extending between a hole inlet and a hole outlet, wherein the hole has a first portion having a first roughness and a second portion having a second roughness that is less than the first roughness, and wherein the first portion is upstream of the second portion, and wherein surface roughness gradually and continuously decreases along an inner hole surface of the at least one hole in a direction extending from an inlet of the first portion to an outlet of the second portion.

13. A gas turbine engine comprising:
a compressor section;
a combustor section downstream of the compressor section;
a turbine section downstream of the combustor section; and
wherein at least one of the combustor section and the turbine section include a component having a body with at least one hole formed within the body and extending between a hole inlet and a hole outlet, and wherein the hole has a first portion having a first roughness and extending along a first length starting from the hole inlet and a second portion having a second roughness that is less than the first roughness and the second portion extending along a second length from an end of the first portion to the hole outlet, and wherein the first portion is upstream of the second portion and the second length is greater than the first length.

14. The gas turbine engine according to claim 13 wherein the engine component body is comprised of a ceramic matrix composite material or monolithic ceramic material.

15. The gas turbine engine according to claim 14 wherein the first roughness is within a first range of no more than 10 mils and the second roughness is within a second range of 0 to 4 mils, and wherein any of various combinations of the first and second roughnesses can be utilized within the first and second ranges as long as the first roughness is always greater than the second roughness.

16. The gas turbine engine according to claim 15 wherein the first portion comprises a metering portion and the second portion comprises a diffusing portion, and wherein at least a portion of an internal surface of the diffusing portion is coated with at least one of an environmental barrier coating and a thermal barrier coating.

17. The gas turbine engine according to claim 15 wherein the first portion comprises a metering portion and the second portion comprises a diffusing portion, and wherein the component comprises at least one of an airfoil, combustor panel, and blade outer air seal, and wherein the at least one hole comprises a cooling hole that extends from a first surface on the body to a second surface on the body that is exposed to a higher temperature than the first surface, and wherein the hole inlet is in fluid communication with a cooling air flow and the hole outlet directs cooling flow to the second surface, and wherein the first length extends from the hole inlet to an end of the metering portion and the second length extends from the end of the metering portion to the bole outlet.

18. The gas turbine engine according to claim 13 wherein surface roughness gradually and continuously decreases along an inner hole surface of the at least one hole in a direction extending from an inlet of the first portion to an outlet of the second portion.

19. The gas turbine engine according to claim 13 wherein the first portion comprises a metering portion defined by a first cross-sectional area and the second portion comprises a diffusing portion defined by a second cross-sectional area that is greater than the first cross-sectional area, and wherein the first cross-sectional area is round and is constant along the first length, and wherein the second cross-sectional area is oval or elliptical.

20. A method of forming a cooling hole for a gas turbine engine comprising the steps of:
   forming at least one hole in an engine component body to extend between a hole inlet and a hole outlet; and
   forming the hole with a first portion extending along a first length and having a first roughness and a second portion extending along a second length and having a second roughness that is less than the first roughness, wherein the first portion is upstream of the second portion and wherein the second length is greater than the first length.

21. The method according to claim 20, including forming the engine component body from a ceramic matrix material or monolithic ceramic material.

22. The method according to claim 21 including forming the first roughness to be within a first range of no more than 10 mils and the second roughness to be within a second range of 0 to 4 mils, and wherein any of various combinations of the first and second roughnesses can be utilized within the first and second ranges as long as the first roughness is always greater than the second roughness.

23. The method according to claim 21 wherein the first portion comprises a metering portion and the second portion comprises a diffusing portion, and including coating at least a portion of an internal surface of the diffusing portion with at least one of an environmental barrier coating and a thermal barrier coating.

24. The method according to claim 20 wherein the second portion is at the hole outlet and the first portion is at the hole inlet, and including laser drilling from a side of the component that includes the second portion to form the hole.

25. The method according to claim 20 including forming the first portion as a metering portion defined by a first cross-sectional area and the second portion as a diffusing portion defined by a second cross-sectional area that is greater than the first cross-sectional area, and wherein the first length extends from the hole inlet to an end of the metering portion and the second length extends from the end of the metering portion to the hole outlet.

26. The method according to claim 25 wherein the first cross-sectional area is round and is constant along the first length, and wherein the second cross-sectional area is oval or elliptical.

27. The method according to claim 20 wherein surface roughness gradually and continuously decreases along an inner hole surface of the at least one hole in a direction extending from an inlet of the first portion to an outlet of the second portion.

28. The method according to claim 20 wherein the first roughness is within a first range of more than 4 mils to 20 mils and the second roughness is within a second range of 0.5 mil to 4 mils.

* * * * *